United States Patent
Chen

(10) Patent No.: US 10,503,694 B2
(45) Date of Patent: Dec. 10, 2019

(54) DELETING ITEMS BASED ON USER INTERATION

(71) Applicant: Alibaba Group Holding Limited, George Town (KY)

(72) Inventor: Aiqing Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 185 days.

(21) Appl. No.: 15/626,958

(22) Filed: Jun. 19, 2017

(65) Prior Publication Data

US 2018/0004768 A1    Jan. 4, 2018

(30) Foreign Application Priority Data

Jun. 29, 2016    (CN) .......................... 2016 1 0499292

(51) Int. Cl.
| | | |
|---|---|---|
| *G06F 16/16* | (2019.01) | |
| *G06F 3/0482* | (2013.01) | |
| *G06F 3/0484* | (2013.01) | |
| *G06F 3/0488* | (2013.01) | |
| *G06F 7/00* | (2006.01) | |
| *H04M 1/725* | (2006.01) | |
| *G06F 16/00* | (2019.01) | |
| *G06F 3/06* | (2006.01) | |

(52) U.S. Cl.
CPC .......... *G06F 16/162* (2019.01); *G06F 3/0482* (2013.01); *G06F 3/0484* (2013.01); *G06F 3/04883* (2013.01); *G06F 7/00* (2013.01); *G06F 16/00* (2019.01); *H04M 1/72522* (2013.01); *G06F 3/0652* (2013.01); *H04M 2250/12* (2013.01); *H04M 2250/22* (2013.01)

(58) Field of Classification Search
CPC ............. G06F 16/162; G06F 17/30117; G06F 3/0482; G06F 3/0484; G06F 3/04883; G06F 7/00; G06F 16/00; G06F 3/0652; H04M 2250/12; H04M 2250/22; H04M 1/72522
See application file for complete search history.

(56) References Cited

U.S. PATENT DOCUMENTS

| | | | |
|---|---|---|---|
| 6,389,433 B1 | 5/2002 | Bolosky | |
| 7,345,671 B2 | 3/2008 | Robbin | |
| 7,479,949 B2 | 1/2009 | Jobs | |
| 8,059,101 B2 | 11/2011 | Westerman | |
| 8,818,971 B1 | 8/2014 | Fontoura | |
| 8,914,330 B2 | 12/2014 | Chron | |
| 2013/0117698 A1 | 5/2013 | Park | |
| 2015/0134913 A1* | 5/2015 | Huang | G06F 12/0833 711/135 |
| 2016/0063009 A1* | 3/2016 | Charania | G06F 16/162 707/693 |
| 2016/0165284 A1 | 6/2016 | Bargagni | |

* cited by examiner

*Primary Examiner* — Robert W Beausoliel, Jr.
*Assistant Examiner* — Hau Hoang
(74) *Attorney, Agent, or Firm* — Van Pelt, Yi & James LLP

(57) ABSTRACT

Deleting items based on user interaction is disclosed, including: determining a set of items to delete from a device; generating a representation associated with the set of items; presenting the representation associated with the set of items at the device; detecting a user input operation associated with modifying the presentation of the representation associated with the set of items at the device; and deleting at least a portion of the set of items based at least in part on the modified presentation of the representation associated with the set of items.

17 Claims, 14 Drawing Sheets

DELETING ITEMS BASED ON USER INTERATION

CROSS REFERENCE TO OTHER APPLICATIONS

This application claims priority to People's Republic of China Patent Application No. 201610499292.7 entitled A DISPLAY METHOD, A METHOD AND A MEANS FOR CLEARING FILES, A DISPLAY DEVICE AND AN ELECTRONIC DEVICE filed Jun. 29, 2016 which is incorporated herein by reference for all purposes.

FIELD OF THE INVENTION

The present application relates to a field of device technology. In particular, the present application relates to techniques for clearing files at an electronic device.

BACKGROUND OF THE INVENTION

Files may accumulate on a device (e.g., a smartphone) due to various reasons. For example, users may download files onto a device from a web browser and/or receive at the device files that are sent from other devices. As such, over time, a smartphone typically stores a large quantity of cache files and installation package files, in addition to other types of downloaded content. If these files (e.g., cache files and installation package files) are not promptly cleared, they will accumulate and consume a large portion of the overall storage space at the device. Conventionally, a user clears (e.g., permanently deletes) files by marking certain applications to be deleted using a clearing software, for example. However, by simply marking files for deletion, the user may fail to get a sense of the progress and/or outcome of the file clearing process.

BRIEF DESCRIPTION OF THE DRAWINGS

Various embodiments of the invention are disclosed in the following detailed description and the accompanying drawings.

DETAILED DESCRIPTION

Figure 1:
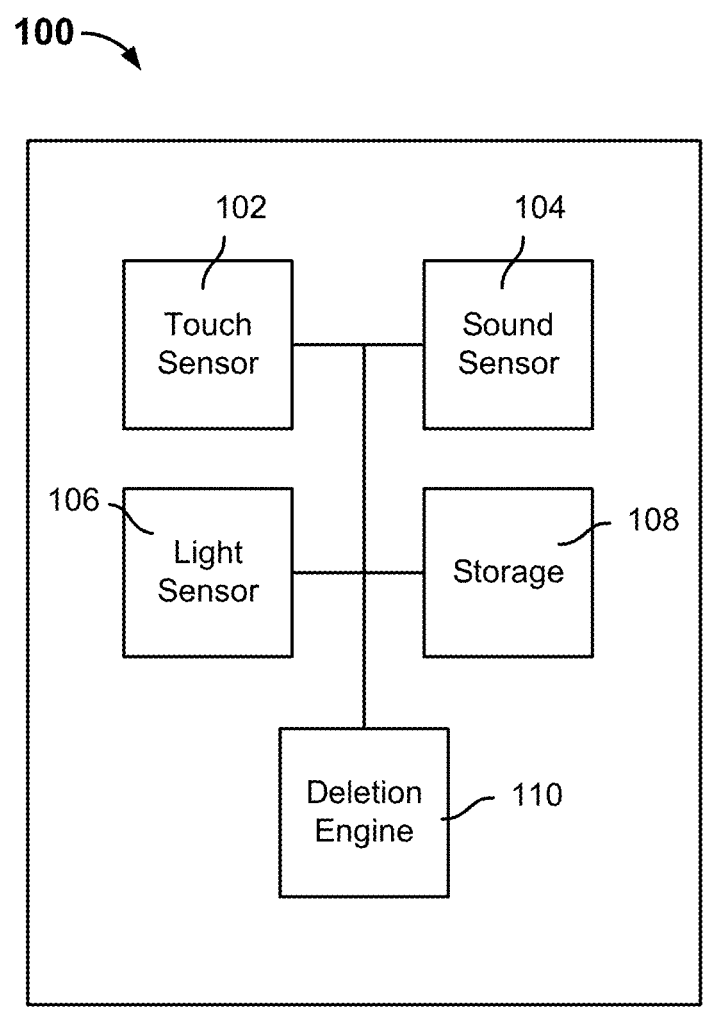
FIG. 1 is a diagram showing an embodiment of a device at which items are deleted based on user interaction.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The exemplary embodiments will be explained in detail herein. Examples thereof are presented in the drawings. In cases where the following descriptions relate to figures, the same numbers in different figures represent the same or similar elements, unless otherwise indicated. The implementations described in the exemplary embodiments below do not represent all of the implementations consistent with the present application. On the contrary, they are merely examples of means and methods consistent with some aspects of the present application, as described in detail in the claims.

The terms used in the present application merely serve to describe specific embodiments and are not intended to restrict the present application. The singular forms of "a," "said," and "the" used in the present application and the attached claims are also intended to include plural forms, unless otherwise clearly indicated by the context. Also, please understand that the term "and/or" used in this document refers to and contains any or all possible combinations of one or more associated elements.

Please understand that although the present application employs the terms "first," "second," "third," and so on to describe various information, this information shall not be limited by these terms. These terms merely serve to differentiate pieces of information of the same category. For example, so long as they remain within the scope of the present application, a first piece of information could be called a second piece of information. Similarly, a second piece of information could be called a first piece of information. The term "if" that is used herein may be interpreted as "when" or "upon being confirmed," depending on the context.

Embodiments of deleting items based on user interaction are described herein. A set of items to be deleted from a device is determined. In various embodiments, an "item" comprises a file such as, for example, a cache file, an installation package file, or a residual file of unloaded software. Examples of cache files and installation package files include electronic files that are downloaded using the device's browser or downloaded by online or instant chat software. Examples of unloaded residual files comprise data files left over by unloaded software (e.g., software that is not currently executed). In various embodiments, to "delete" a set of items comprises to mark the items for deletion (e.g., the items will no longer be accessible to the user and their locations in storage marked to be reclaimed by new data) or to permanently removed from the device (e.g., their locations in storage are overwritten by new data such that the items are no longer stored at the device). A representation associated with the set of items is generated. For example, the representation comprises data that can be presented as a visualization of the set of items. In a specific example, the representation comprises a multimedia file such as a thumbnail image associated with one or more of the set of items to be deleted. The representation associated with the set of items is presented at the device (e.g., at the touchscreen of the device). A user input operation associated with modifying the presentation of the representation associated with the set of items is detected at the device. As will be described in further detail below, the user input operation may comprise various different types of user input with respect to the device and different types of user input operations may be detected by different sensors that are part of the device. In various embodiments, the greater repetitions of and/or the greater duration of a user input operation that is detected, the greater the extent to which the appearance of the representation will be modified in its presentation at the device. For example, the greater repetitions of and/or the greater duration of a user input operation, the more that the presentation of the representation will be reduced in size. How much of the set of items will be deleted will be determined by the modified presentation of the representation associated with the set of items.

FIG. 1 is a diagram showing an embodiment of a device at which items are deleted based on user interaction. Device 100 includes touch sensor 102, sound sensor 104, light sensor 106, storage 108, and deletion engine 110. In various embodiments, each of touch sensor 102, sound sensor 104, light sensor 106, and deletion engine 110 may be implemented using one or more of hardware and software.

Device 100 may comprise a mobile device, smart phone, tablet device, laptop computer, desktop computer, and/or any other computing device.

Deletion engine 110 is configured to determine a set of items to be deleted. For example, the set of items comprises one or more files that have been selected by the user to be deleted and/or one or more files that have been stored at storage 108 for at least a predetermined period of time. Deletion engine 110 is configured to analyze the attributes and/or metadata associated with the set of items to determine a corresponding representation of the set of items. For example, the representation may comprise a thumbnail image based on at least one image that is included in the set of items and/or a generic image that is not specific to any content included in the set of items. Deletion engine 110 is further configured to present the representation at the display (e.g., touchscreen) of device 100. For example, the representation is presented in a manner that overlays any other content that was previously presented at the device (e.g., a previously executing application or the desktop of the device). In some embodiments, the representation may also be presented with text or another form of instructions that invite a user to interact with device 100 in at least one particular way to modify the appearance of the representation that is presented. Examples of the presentation of the representation are described below in connection with FIG. 3A. The deletion engine can be implemented as a stand-alone application, or a part of the operating system.

Upon seeing the presentation of the representation at device 100, a user may perform an operation with respect to device 100 per the instructions, that are presented with the representation, that describe the particular type of user interaction that is to be detected. Different types of user input operations may be detected by a different sensor that is included in device 100.

In some embodiments, a first type of user interaction is a user touch operation on the screen of device 100 and can be detected by touch sensor 102. In some embodiments, touch sensor 102 comprises a touchscreen that is layered over an electronic visual display component of device 100 and is configured to capture user motions involving contact with the screen. For example, a user input operation that is detectable by touch sensor 102 comprises a user's finger motion or user's use of a stylus to wipe/clear away at least a portion of the presentation of the representation at the screen of device 100. For example, a portion of the presentation of the representation that is wiped/cleared away by a user's touch motion becomes hidden from view at the screen and thereby reduces the amount/size of the presentation of the representation that can be viewed at the screen.

In some embodiments, a second type of user interaction is a user inputting a sound operation (e.g., by blowing air) towards device 100 and can be detected by sound sensor 104. In some embodiments, sound sensor 104 comprises a microphone and is configured to capture sounds. In some embodiments, sound sensor 104 comprises an air flow sensor and is configured to detect air flow, derive airflow velocity, and calculate airflow volumes. For example, a user input operation that is detectable by sound sensor 104 comprises blowing air into sound sensor 104, which may have an interface at the exterior of device 100 for ease of access. For example, the longer that the user blows air into sound sensor 104, the more of the presentation of the representation that is wiped/cleared away and becomes hidden from view at the screen. Therefore, the longer the duration of a user blowing air (or making another noise) into sound sensor 104, the less that the representation can be viewed at the screen.

In some embodiments, a third type of user interaction is a user making a gesture near device 100 and can be detected by light sensor 106. In some embodiments, a user's gesture may also be captured by a motion sensor 106 (not shown) in device 100. In some embodiments, light sensor 106 is configured to capture changes in light intensity near device 100. For example, a user input operation that is detectable by light sensor 106 comprises a user hand performing a gesture (e.g., a hand wave) near light sensor 106 of device 100. For example, the more hand wave motions detected by light sensor 106 (e.g., as a function of the patterns of changes in light), the more the presentation of the representation is wiped/cleared away and becomes hidden from view at the screen. Therefore, the greater the number of hand wave motions that are detectable as changes in the light intensity near light sensor 106, the less that the representation can be viewed at the screen.

In some embodiments, a fourth type of user interaction is a cursor operation on the screen of device 100 and can be detected by a pointing device (not shown) that is connected to and/or a part of device 100. In some embodiments, the pointing device comprises a computer mouse. For example, a cursor operation that is detectable by the pointing device comprises a user using the cursor that appears at the display screen of device 100 to wipe/clear away at least a portion of the presentation of the representation at the screen of device 100. For example, a portion of the presentation of the representation that is wiped/cleared away by a user's cursor operation becomes hidden from view at the screen and thereby reduces the amount/size of the presentation of the representation that can be viewed at the screen.

Deletion engine 110 is configured to determine how much of the set of items to actually delete from storage 108 based on the amount, if any, of the presentation of the representation that is still viewable at the screen after the completion of the user input operation(s), as will be described in further detail below.

Figure 2:
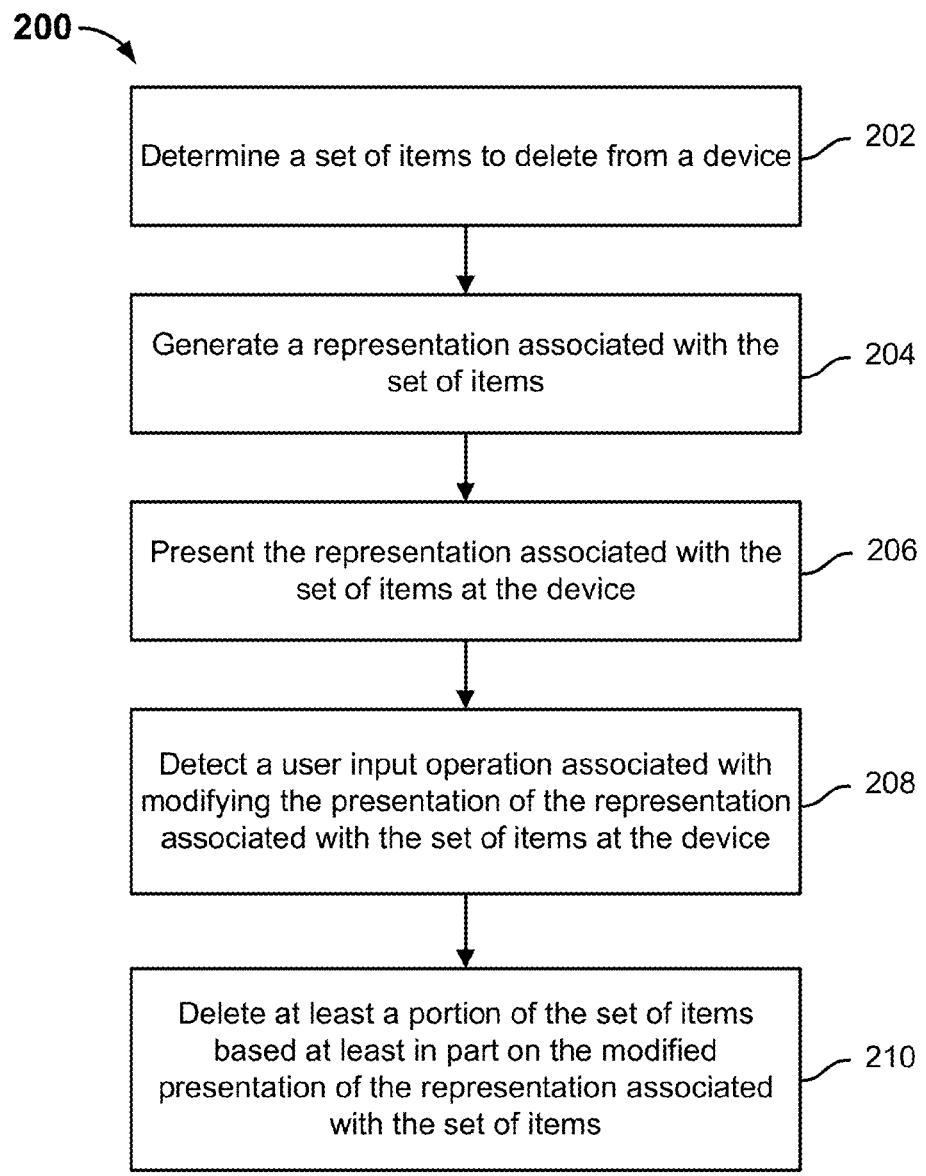
FIG. 2 is a flow diagram showing an embodiment of a process for deleting a set of items at a device.

FIG. 2 is a flow diagram showing an embodiment of a process for deleting a set of items at a device. In some embodiments, process 200 is implemented on a device such as device 100 of FIG. 1.

At 202, a set of items is determined to be deleted from a device.

In some embodiments, a set of items to be deleted may be determined as a set of items that have been identified by a user to be deleted at the device. For example, the user may have selected one or more items to delete from a file clearing application that is executing at the device (e.g., a storage management application on the iPhone). In another example, the user may have selected one or more items to delete by inputting a preset multi-key combination for triggering file clearing at the device. In some embodiments, a set of items may be programmatically determined to be deleted by an application or operating system executing at the device. For example, when the storage space occupied by a set of items accounts for a predetermined threshold percentage (e.g., 50%) of the total storage space, those items may be automatically determined to be deleted. In another example, when a set of items has not been opened/used at the device for more than a predetermined threshold of time, those items may be automatically determined to be deleted.

At 204, a representation associated with the set of items is generated.

A visual representation of the set of items is generated. In various embodiments, the representation comprises a multimedia file such as a picture or video with or without audio effects. In some embodiments, the representation is generated based on metadata and/or content associated with the items in the set to be deleted. For example, the representation may be a thumbnail version of an image that is included in the set of items to be deleted. In some embodiments, the attributes of the representation to be generated may include the shape of the representation displayed on the display screen, the size of the representation that is displayed on the display screen, the image(s) of the representation that are displayed on the display screen, and so on. For example, the representation may be presented as a rectangular file with image content. The size of the representation is one-tenth of the total area of the display screen of the device. The image of the representation may comprise a color distribution of specific colors. In some embodiments, the display area of the representation on the display screen of the device may be proportional to the set of items to be deleted. For example, when the items to be deleted are 10 MB in size, the display area of the representation on the display screen is a×b, and when the items to be deleted are 20 MB in size, the display area of the representation on the display screen is a×2b, wherein a is the width of the shape of the representation, and b is the height of the shape of the representation. Persons with ordinary skill in the art can understand that the areas of the shapes described above and the storage amounts occupied by the items to be deleted are merely illustrative. By keeping the storage area occupied by the items to be deleted consistent with the area of the representation, in some embodiments, one can cause the storage space occupied by the items to be deleted to take on additional visual shapes.

At 206, the representation associated with the set of items is presented at the device.

The representation (e.g., a multimedia file) is presented at the display screen of the device. In some embodiments, the representation is presented as an overlay over an executing application at the device. In some embodiments, the representation is presented as an overlay over a desktop display of icons associated with one or more applications that have been installed on the device. The representation may be presented at the display screen of the device in any way that is designed to capture the attention of the user. In some embodiments, the representation is also presented with instructions (e.g., text and/or an image) that instruct a user to interact with the presented representation to cause at least some of the set of items to become deleted. For example, the presented instructions may instruct the user to bring one or more fingers (or a stylus pen) to the display screen (which is also a touchscreen) and make swiping motions against the portion of the touchscreen that includes the presentation of the representation. In another example, the presented instructions may instruct the user to make a specified noise (e.g., a blowing noise) into a microphone or air flow sensor of the device. In yet another example, the presented instructions may instruct the user to make a gesture (e.g., a wave of the user's palm) near a light sensor of the device.

At 208, a user input operation associated with modifying the presentation of the representation associated with the set of items is detected at the device.

The greater extent to which the user input operation (e.g., the more finger swiping actions that were detected against the touchscreen, the longer the duration of the user's producing a noise into the microphone or air flow sensor, or the greater the number of repetitions of a hand motion near the device) is performed and detected by the device, the greater extent to which the presentation of the representation will be modified. In various embodiments, the greater extent to which the user input operation is performed and detected by the device, the more of the area of the representation that becomes erased/cleared away or hidden from view at the display screen of the device. As such, the greater extent of the user input operation that is detected, the less of the area of the representation that remains visible at the display screen of the device, so the user can experience/see a reduction/removal in the representation of the set of items to be deleted that is proportional to the extent of their user input operation.

At 210, at least a portion of the set of items is deleted based at least in part on the modified presentation of the representation associated with the set of items.

How much area of the representation that remains to be presented at the display screen at the device correlates with the amount of the set of items that is to be deleted. In some embodiments, if the presented representation is entirely erased/cleared away, then the set of items is to be deleted entirely. In some embodiments, if a threshold amount (e.g., area) of the representation has been erased/cleared away, then the set of items is to be deleted entirely. In some embodiments, if less than a threshold amount (e.g., area) of the representation has been erased/cleared away, then the portion of the set of items that is to be deleted may be proportional to the erased/cleared away area of the representation. In various embodiments, the amount of storage space that is freed as a result of the amount of items that are deleted is subsequently presented at the display screen for the device (e.g., so that the user can receive confirmation of the deletion as well as a sense of how much storage space was freed up as a consequence).

By allowing a user to physically interact with a device to modify the presentation (e.g., reduce the area) of a representation of a set of items to be deleted, the user is able to better perceive the act and progress of deleting items at the device. The interactive nature of deleting files from the device may also incentivize users to more regularly delete unused items off of the device.

Figure 3A:
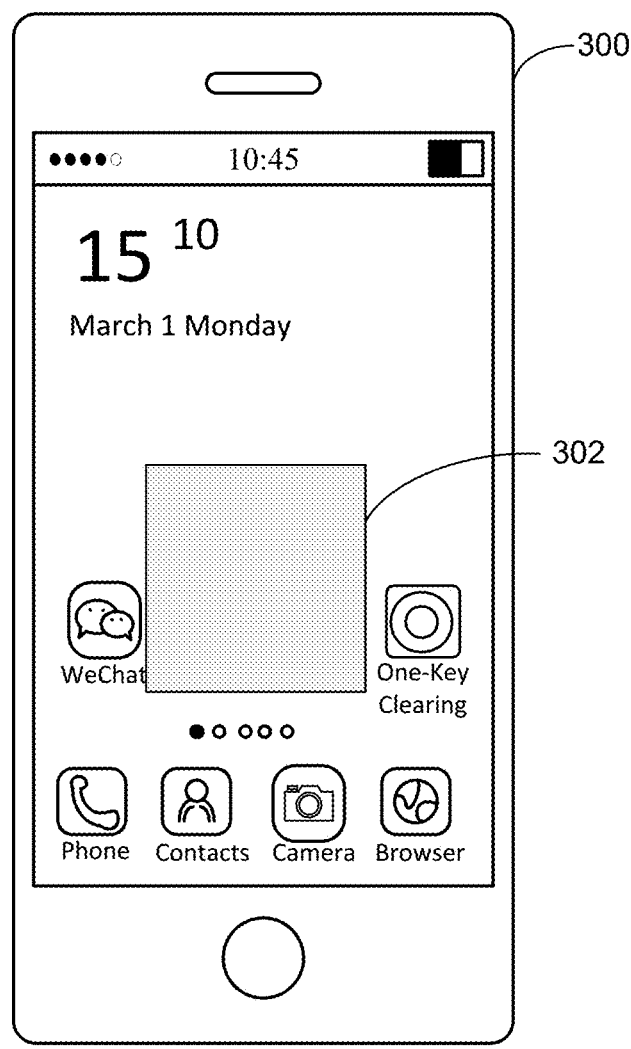
FIGS. 3A through 3D show example display screens of a device and using user input operations comprising a user's swipes through at least some of a representation of a set of items to delete at least a portion of the set of items.
Figure 3B:
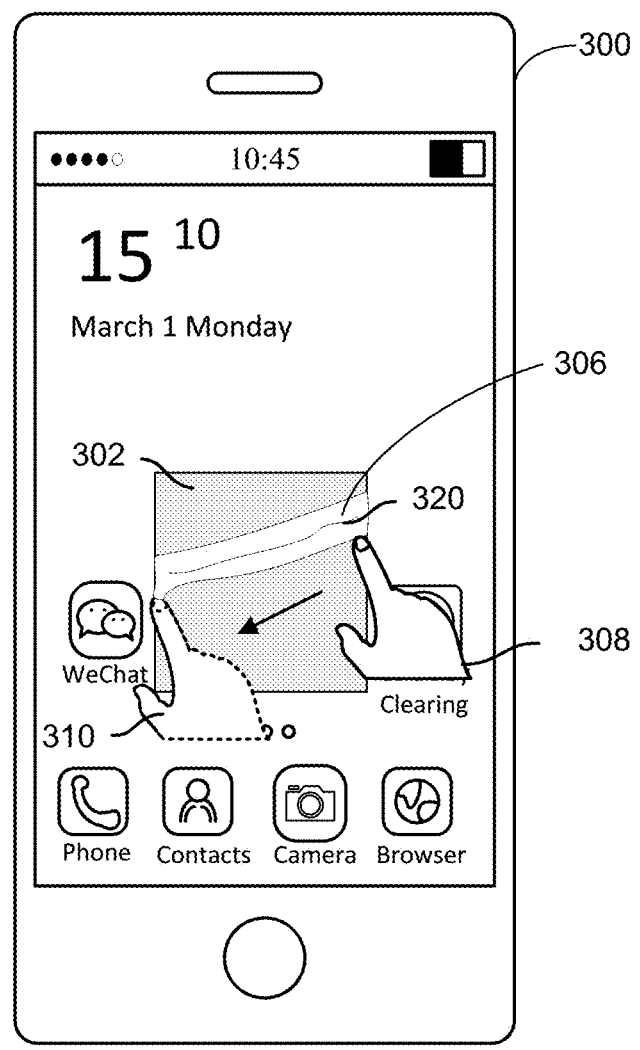
Figure 3C:
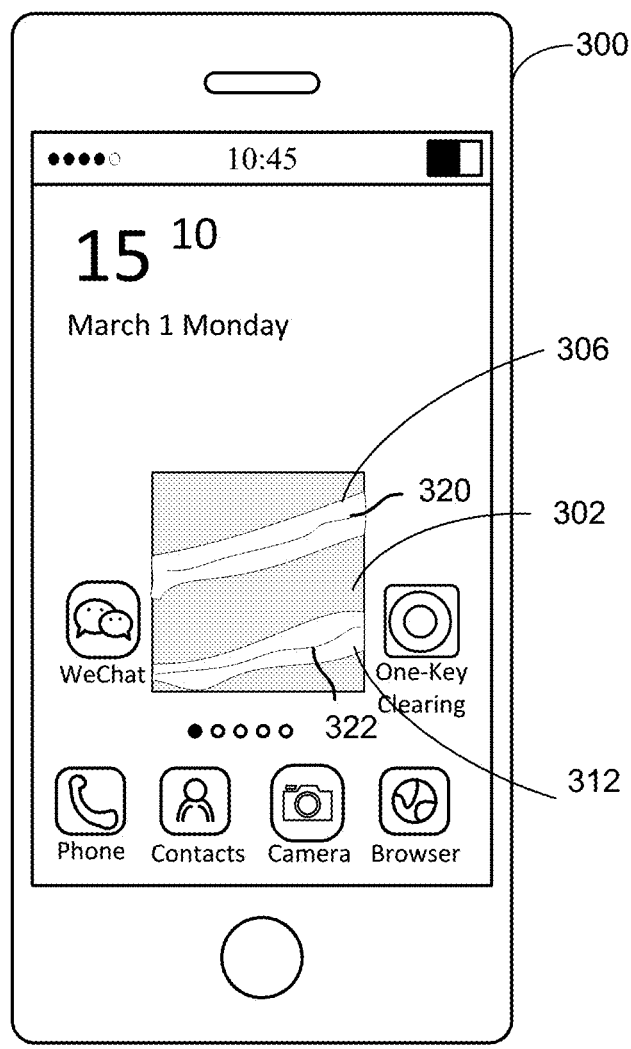

FIGS. 3A through 3D show example display screens of a device and using user input operations comprising a user's swipes through at least some of a representation of a set of items to delete at least a portion of the set of items. FIG. 3A is an example of a display screen of device 300 at which representation 302 of a set of items that is to be deleted is presented. Representation 302, in this example, comprises an image and is overlaid on some icons that are displayed at device 300. In some embodiments, the size and appearance of representation 302 is determined based on metadata and/or content of the items to be deleted. FIG. 3B is a first example of a modified presentation of representation 302 after a user input operation has occurred with respect to representation 302. Specifically, in the example of FIG. 3C, the user input operation that is detected by (e.g., a touchscreen of) device 300 is a user's finger swipe through representation 302. As shown in the example of FIG. 3B, as the user's finger moves from location 308 to 310 through representation 302, the user's finger movement is tracked and the presentation of representation 302 is updated to reflect the user's tracked finger swipe. The result of the user's finger swipe is the removal from view of portion 306 of representation 302 that was affected by the user's finger swipe, as if portion 306 was erased by the user's finger. FIG. 3C is a second example of a modified presentation of representation 302 after a subsequent user input operation has occurred with respect to representation 302. Specifically, in the example of FIG. 3C, the user input operation that is detected by (e.g., a touchscreen of) device 300 is a user's subsequent finger swipe through representation 302. The result of the user's second finger swipe through a part of representation 302 below portion 306 of representation 302 is the removal from view of portion 312 of representation 302 that was affected by the user's second finger swipe, as if portion 312 was erased by the user's finger.

In some embodiments, to determine the portion of the presentation of the representation that has been affected by a user's touch operation, the center curve of a user's touch operation with respect to the representation is determined. Referring to FIGS. 3B and 3C, the center curves 320 and 322 corresponding to the first and second user's touch operations are shown. The center curves 320 and 322 correspond to the user's touch operations on the touchscreen. In some embodiments, a predetermined distance (e.g., measured in number of pixels, centimeters, etc.) is extended from both sides of the center curves 320 and 322 to obtain the respectively affected portions of representation 302. Multiplying the predetermined distance by the distance of the swipe will yield the approximate size/area of the affected area, in some embodiments. Correspondingly, affected portions of representation 302 are no longer displayed at the display screen of device 300.

Additional user input operations comprising user's swiping motions across representation 302 may be received (not shown) and cause corresponding portions of representation 302 to be hidden from view at the display screen of device 300.

In a different example of modifying the presentation of representation 302 in response to a detected user input operation that is not shown in the examples of FIGS. 3A through 3C, as more user input operations are detected with respect to representation 302, the presentation of representation 302 may be presented as increasingly less sharp and more blurry until an image associated with representation 302 disappears altogether. The blurring effects can be achieved by applying a filter to the original image, substituting pixels in the original image, and/or other appropriate techniques, in some embodiments. Also, if representation 302 included sounds, then as more user input operations are detected with respect to representation 302, the presentation of representation 302 may be presented as emitting quieter and quieter sounds until the sounds disappear altogether. In yet another example of modifying the presentation of representation 302 in response to a detected user input operation, as more user input operations are detected with respect to representation 302, the presentation of representation 302 may gradually disappear from top to bottom.

Figure 3D:
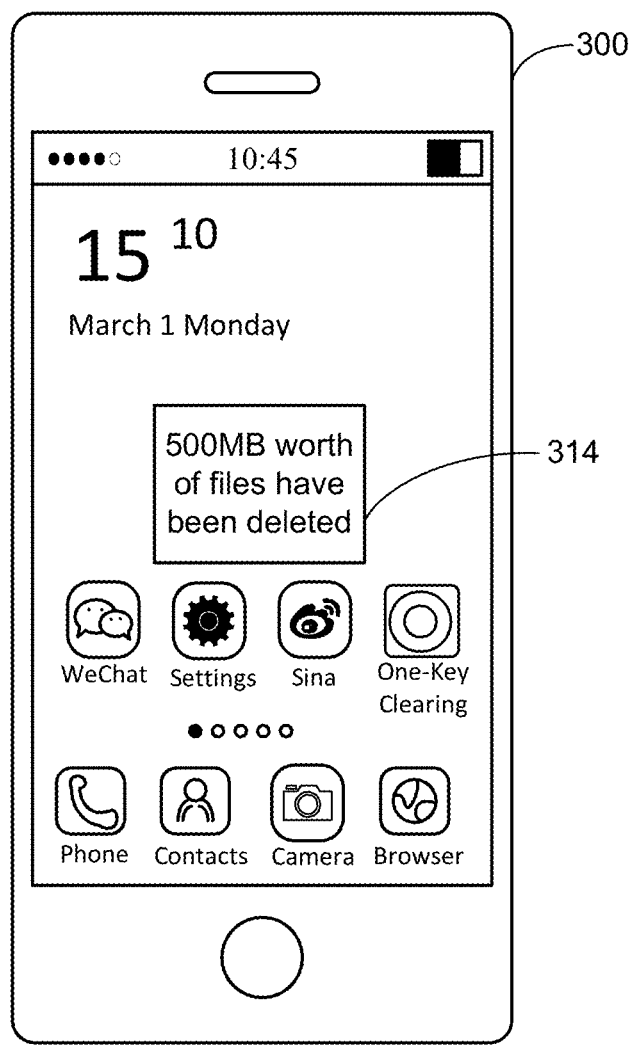

Depending on how much of representation 302 is cleared away in response to one or more user input operations, at least a portion of the set of items that is represented by representation 302 is deleted from device 300. As described above, to delete items refers to either marking the storage space associated with such items for reclamation or to immediately overwrite the storage space associated with such items with new data. After the user input operations are detected to have stopped (e.g., based on a lack of detected user input operations for at least a predetermined period of time), it is assumed that the user has finished interacting with modifying the presentation of representation 302. Once it is determined that the user has finished interacting with modifying the presentation of representation 302, the portion, if any, of representation 302 that remains in view the display screen is analyzed to determine how much of the set of items to delete. In some embodiments, if all of representation 302 has been removed from view by the user input operations, then all of the set of items are to be deleted. In some embodiments, if less than all of representation 302 has been removed from view by the user input operations, then the remaining area of representation 302 is compared to the original area of representation 302 to determine how much of the set of items is to be deleted. For example, the total size of a set of items to be deleted is 600 MB in total. If ⅚ of representation 302 is removed based on one or more user input operations, then ⅚ of 600 MB (or 500 MB) of the set of items will be deleted. FIG. 3D is an example of a display screen at which a message that indicates the size of the items that have been deleted as a result of modification of the presentation of representation 302 by one or more user input operations is displayed at 314. After device 300 detected that the user input operations have completed, the remainder, if any, of representation 302 was checked to determine how much of the original total size of the set of items to delete. In the example of FIG. 3D, it was determined that 500 MB of the original total size of the set of items (which was at least 500 MB in size) was deleted. In the event that the original total size of the set of items is greater than the actual size of items that have been deleted, then in some embodiments, the original total size of the set of items may be presented at the display screen (e.g., "500 MB of 600 MB worth of files have been deleted").

Figure 4:
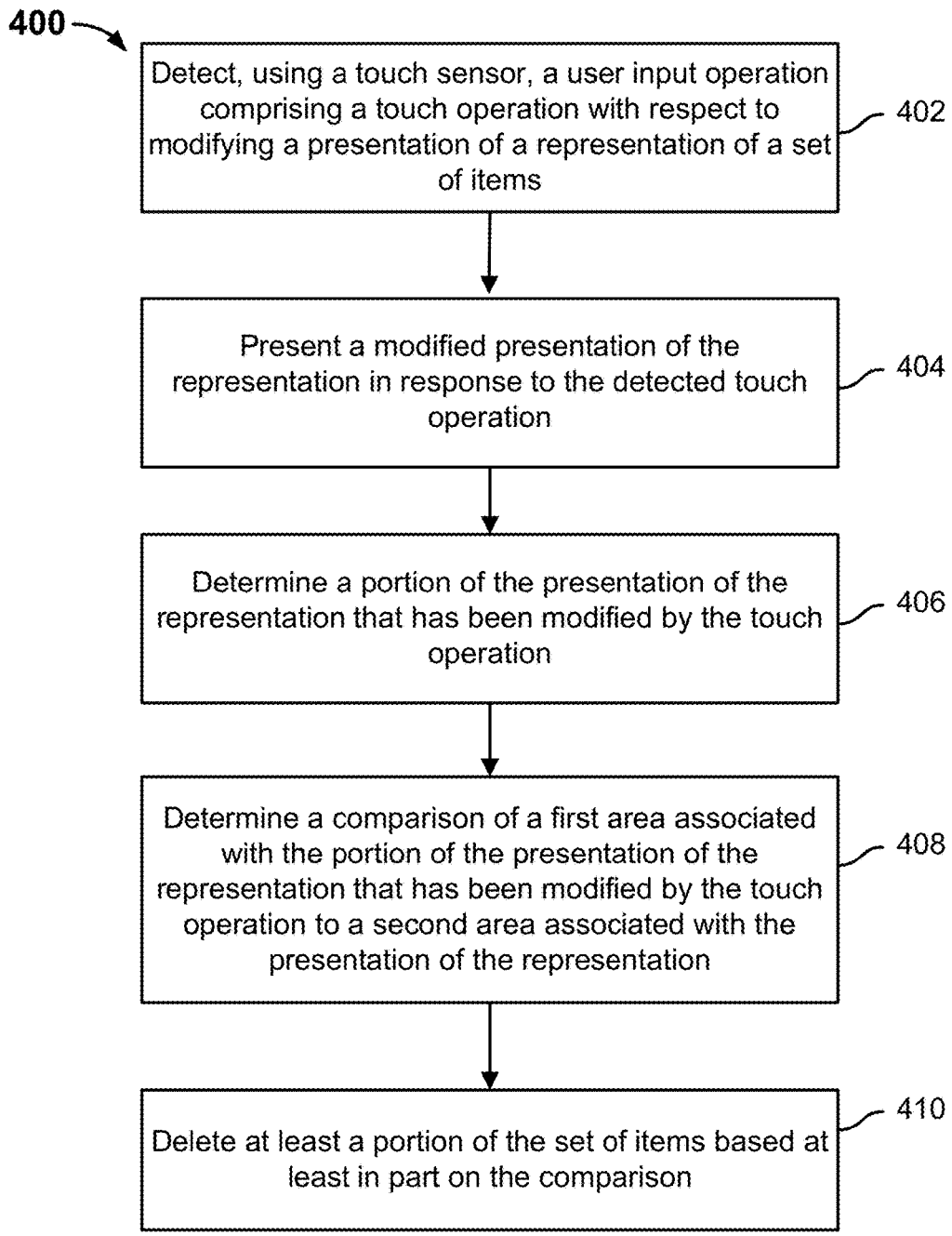
FIG. 4 is a flow diagram showing an example of a process for detecting a user input operation and determining at least a portion of a set of items to delete.

FIG. 4 is a flow diagram showing an example of a process for detecting a user input operation and determining at least a portion of a set of items to delete. In some embodiments, process 400 is implemented at a device such as device 100 of FIG. 1. In some embodiments, steps 208 and 210 of process 200 of FIG. 2 may be implemented, at least in part, using process 400.

Process 400 describes an example of deleting a set of items based on user input operations comprising a user's touch operation (e.g., finger swiping motions) on a representation of a set of items that is presented at a display screen of a device. Process 400 describes deleting a portion of the set of items to be deleted based on the ratio of the representation that was cleared away/removed/modified by one or more user's touch operations.

At 402, a user input operation comprising a touch operation with respect to modifying a presentation of a representation of a set of items is detected using a touch sensor. One or more user input operations comprising user's touch operations on the representation that is presented at the display screen of the device are detected. Each touch operation on the representation that is presented at the display screen clears/removes a corresponding portion of the representation from being displayed.

At 404, a modified presentation of the representation is presented in response to the detected touch operation. In some embodiments, the area of the portion of the representation that has been cleared away/removed/modified by the user's touch operations is presented as being hidden from view at the display screen of the device. For example, the clearing away/removing/modifying of each portion of the representation by the touch operation may be presented as an animation in which the size of the presentation diminishes over several frames. By presenting the modification to the presentation of the representation in response to the user's input operation, the user may experience an immediate feedback to their input operations.

At 406, a portion of the presentation of the representation that has been modified by the touch operation is determined. In some embodiments, the area of the portion of the representation that has been cleared away/removed/modified by the user's touch operations is determined using the technique described above in connection with FIG. 3C. In some embodiments, the area of the portion of the representation that has been cleared away/removed/modified by the user's touch operations may be determined after it is determined that the user has finished performing user input operations. For example, one technique by which to determine that the user has finished performing user input operations is the lack of detected user's touch operations at the touchscreen of the device for at least a predetermined length of time.

At 408, a comparison of a first area associated with the portion of the presentation of the representation that has been modified by the touch operation to a second area associated with the presentation of the representation is determined. In some embodiments, the area of the portion of the representation that has been cleared away/removed/modified by the user's touch operations is compared to the original, total area of the representation (prior to being modified by user input operations) to determine a ratio or a percentage of the representation that has been cleared away/removed/modified.

At 410, at least a portion of the set of items is deleted based at least in part on the comparison. In some embodiments, the ratio or percentage of the total size of the set of items that is deleted as a result of the detected user's touch operations is the same as the ratio or a percentage of the representation that has been cleared away/removed/modified by the user's touch operations. The deletion operation can be performed programmatically. For example, an operating system can be invoked to perform the deletion operation by either marking the storage space associated with the deleted files as "dirty" and therefore ready to be reclaimed/written over by new data or directly overwriting the storage space associated with the deleted files with new or default data.

For example, the device detects that the area of a representation that has been cleared from the display screen is c. The total, original area of the representation is d. Therefore, the total quantity of the set of items to be deleted from the device can be determined according to the ratio of c to d. For example, assume that the ratio of c to d is one-third and the total quantity of the set of items to be deleted on the device is 600 MB. Thus, ⅓ of 600 MB (200 MB) of the set of items to be deleted will be deleted.

Figure 5:
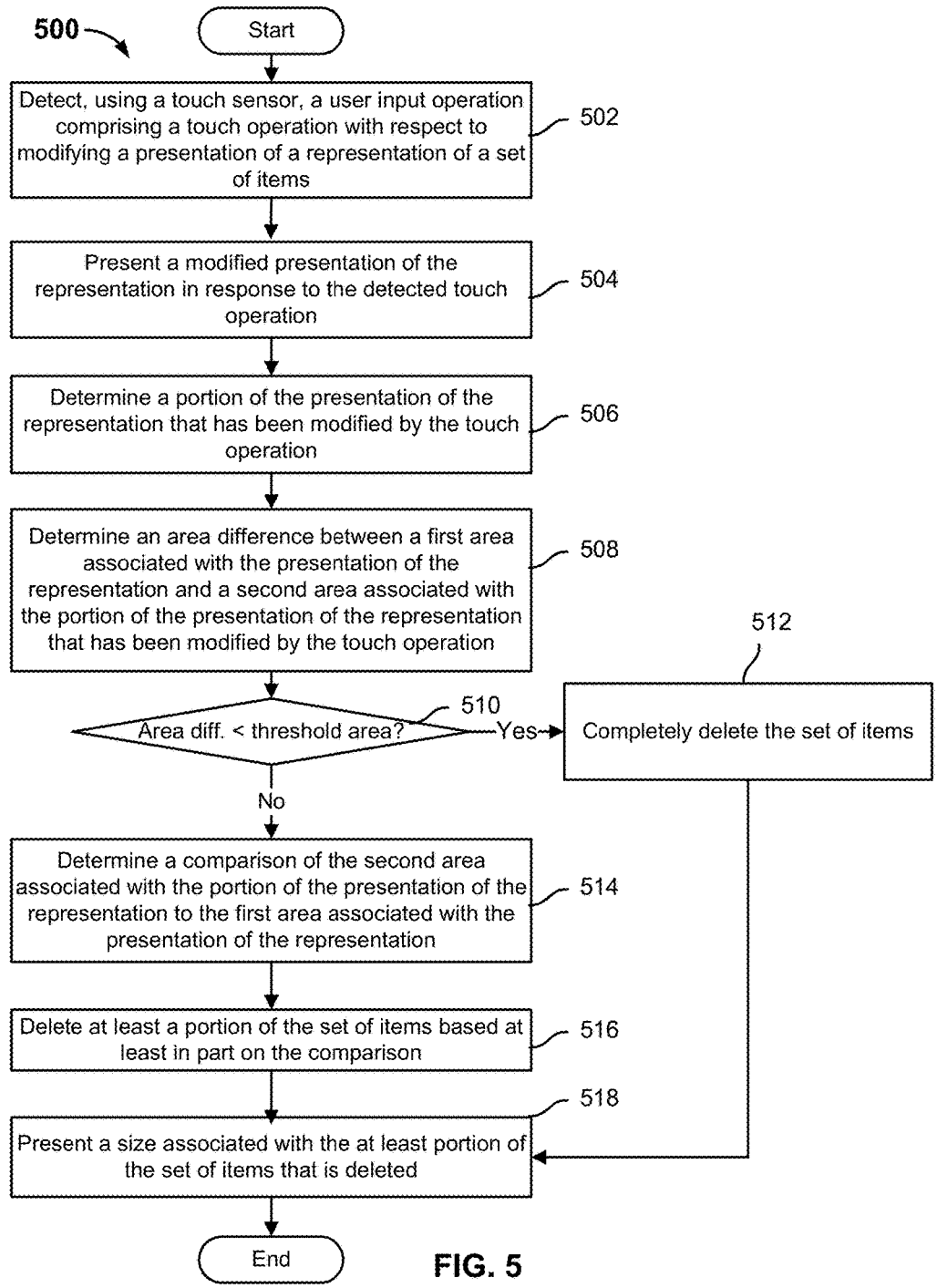
FIG. 5 is a flow diagram showing an example of a process for detecting a user input operation and determining at least a portion of a set of items to delete.

FIG. 5 is a flow diagram showing an example of a process for detecting a user input operation and determining at least a portion of a set of items to delete. In some embodiments, process 500 is implemented at a device such as device 100 of FIG. 1. In some embodiments, steps 208 and 210 of process 200 of FIG. 2 may be implemented, at least in part, using process 500.

Process 500 describes an example of deleting a set of items based on user input operations comprising a user's touch operation (e.g., finger motions) on a representation of a set of items that is presented at a display screen of a device.

At 502, a user input operation comprising a touch operation with respect to a presentation of a representation of a set of items is detected using a touch sensor. Step 502 is similar to step 402 of process 400 of FIG. 4.

At 504, a modified presentation of the representation is presented in response to the detected touch operation. Step 504 is similar to step 404 of process 400 of FIG. 4.

At 506, a portion of the presentation of the representation that has been modified by the touch operation is determined. Step 506 is similar to step 406 of process 400 of FIG. 4.

At 508, an area difference is determined between a first area associated with the presentation of the representation and a second area associated with the portion of the presentation of the representation that has been modified by the touch operation is determined. The area of the remaining portion of the representation that is presented is determined as a difference between the overall area of the presentation of the representation and the portion of the presentation of the representation that has been modified by the touch operation. Put another way, the remaining area of the representation that was not cleared away/removed/modified by one or more user's touch operations is determined.

At 510, it is determined whether the area difference is less than a threshold area. In the event that the area difference is less than the threshold area, control is transferred to 512.

Otherwise, in the event that the first area is not less than the threshold area, control is transferred to 514.

At 512, the set of items is completely deleted. Because the remainder of the representation is less than a predetermined threshold area, it is assumed that the user had intended to delete the entire set of items even if he or she did not clear away/remove/modify the entire presentation of the representation on the display screen. For example, the predetermined threshold area may be determined to be a relatively small percentage (e.g., 10%) of the total, original area of the representation. Therefore, it is possible to ensure that a set of items is to be entirely deleted from the device, which simplifies/reduces the interactions that needs to be performed by the user.

At 514, a comparison of the second area associated with the portion of the presentation of the representation to the first area associated with the presentation of the representation is determined. In some embodiments, the area of the portion of the representation that has been cleared away/removed/modified by the user's touch operations is compared to the original, total area of the representation (prior to being modified by user input operations) to determine a ratio or a percentage of the representation that has been cleared away/removed/modified.

At 516, at least a portion of the set of items to be deleted is determined based at least in part on the comparison. In some embodiments, the ratio or percentage of the total size of the set of items that is deleted as a result of the detected user's touch operations is the same as the ratio or a percentage of the representation that has been cleared away/removed/modified by the user's touch operations.

Figure 6:
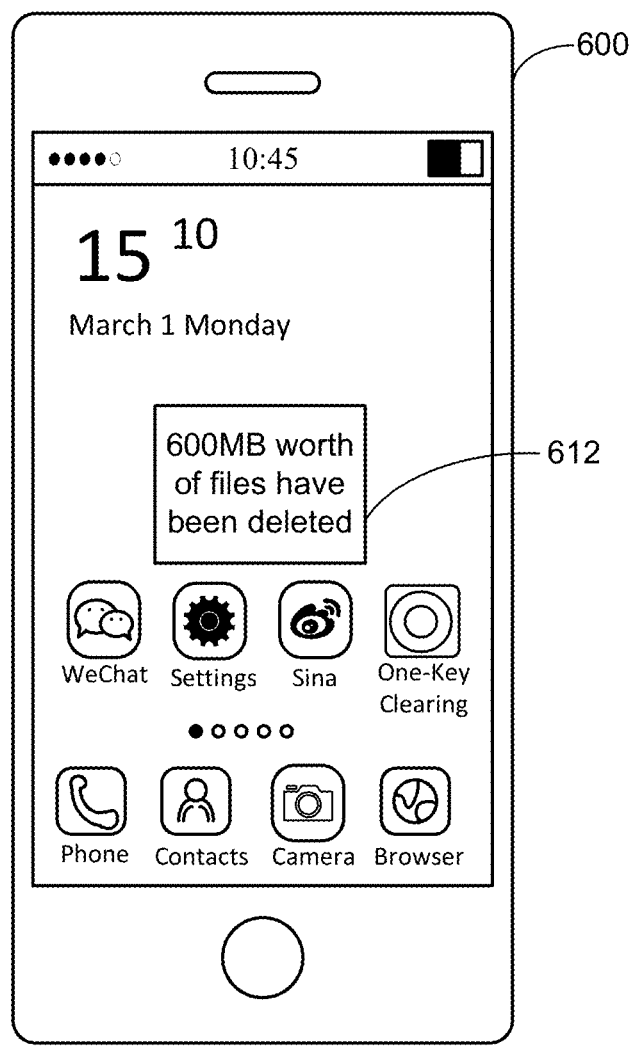
FIG. 6 shows an example display screen that presents a size of items that were deleted.

At 518, a size associated with the at least a portion of the set of items that is deleted is presented. If the entire set of items was deleted at step 516, then the total size of the set of items is presented as the amount of items that was deleted. For example, if the total size of the set of items to be deleted is 600 MB and the entire set of items was determined to be deleted at step 510, then a message that indicates that 600 MB worth of files were deleted is presented, as shown in FIG. 6. In FIG. 6, message 612 that indicates that 600 MB worth of files have been deleted is presented at the display screen of device 600. If less than the entire set of items was deleted at step 516, then the portion of the total size of the set of items that was deleted based on the determined ratio is presented.

As such, some embodiments described herein tightly link a user's touch operations with the device to the process of deleting items from the device so that the user can better perceive the removal of such files.

In some embodiments, process 500 may be similarly implemented for a user input operation that comprises a cursor operation that is detected by a pointing device.

Figure 7:
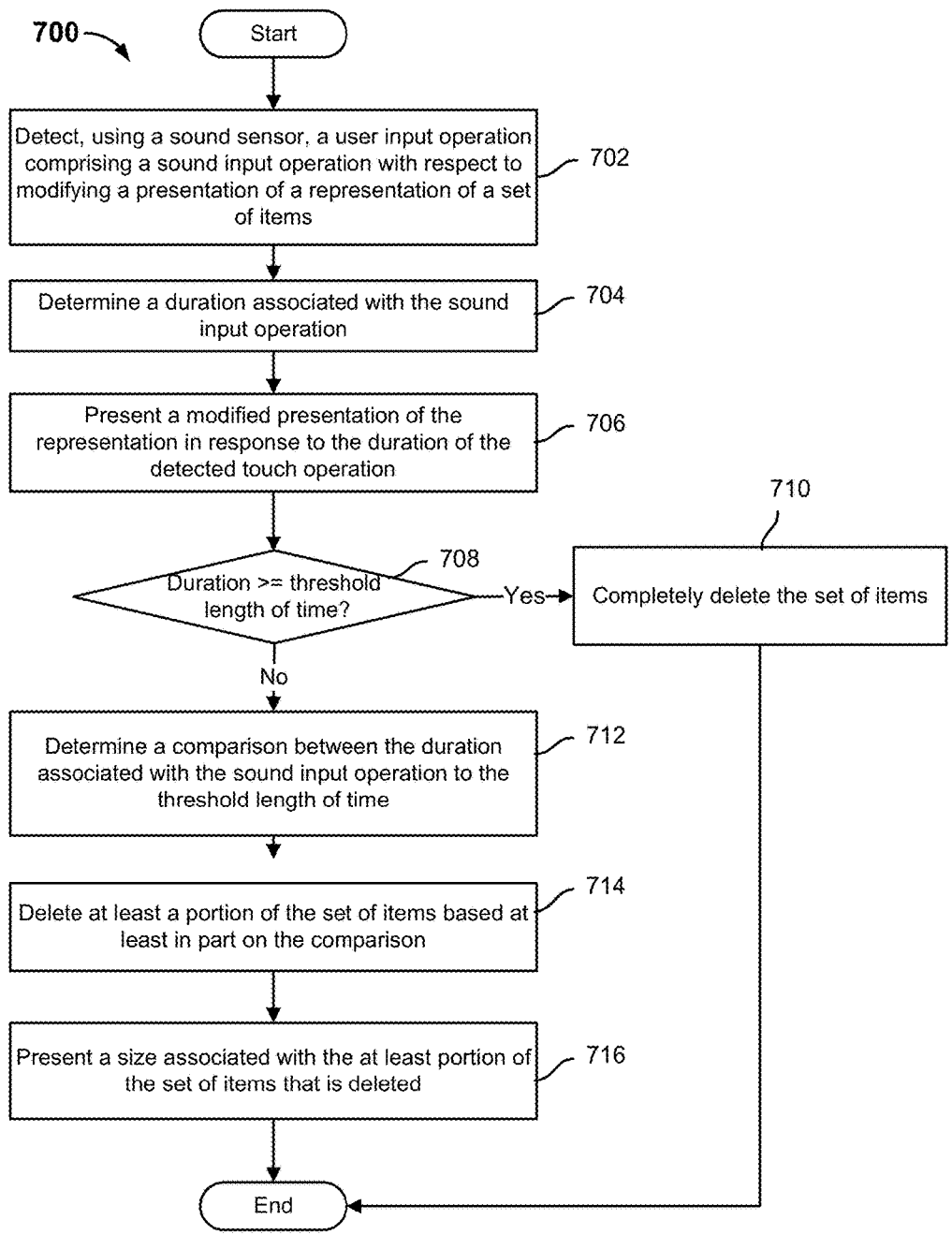
FIG. 7 is a flow diagram showing an example of a process for detecting a user input operation and determining at least a portion of a set of items to delete.

FIG. 7 is a flow diagram showing an example of a process for detecting a user input operation and determining at least a portion of a set of items to delete. In some embodiments, process 700 is implemented at a device such as device 100 of FIG. 1. In some embodiments, steps 208 and 210 of process 200 of FIG. 2 may be implemented, at least in part, using process 700.

Process 700 describes an example of deleting a set of items based on user input operations comprising a user's sound input operation (e.g., producing a sound or blowing air into a microphone or air flow sensor) on a representation of a set of items that is presented at a display screen of a device.

At 702, a user input operation comprising a sound input operation with respect to modifying a presentation of a representation of a set of items is detected using a sound sensor. In some embodiments, the sound sensor comprises a microphone or an air flow sensor. In some embodiments, the sound sensor has an interface near the exterior of the device. In some embodiments, the sound sensor receives input via an earphone jack of the device. For example, the sound input operation produced by the user may comprise a user's verbal speech, a user's blowing air into the interface of the sound sensor, and/or any other type of noise or sound that is produced by a user.

At 704, a duration associated with the sound input operation is determined. A time duration associated with the detected sound input operation is measured. In some embodiments, the sound input operation refers to a continuous sound input. In some embodiments, the sound input operation refers to a series of sound inputs that are separated by brief pauses of silence. The longer the measured duration of the sound input operation, the more that the presentation of a representation of a set of items to be deleted is modified. Specifically, the longer the measured duration of the sound input operation, the more that the presentation of a representation of a set of items to be deleted is cleared away/removed/modified. For example, an airflow sensor detects the airflow strength of a user's air blowing operation. When the detected airflow strength reaches a preset strength value, the duration of the air blowing operation is measured.

At 706, a modified presentation of the representation is presented in response to the duration of the detected sound input operation. In some embodiments, when the measured duration of the sound input operation reaches a threshold length of time, the entire presentation of the representation is cleared away/hidden from view at the display screen of the device. In some embodiments, the threshold length of time is dynamically generated based on the total size of the set of items to be deleted. For example, a unit of time is associated with a unit of storage size, and accordingly, a set of items associated with a larger size will have a correspondingly longer threshold length of time and a set of items associated with a smaller size will have a correspondingly shorter threshold length of time. Any measured duration of the sound input operation that is less than the threshold length of time will result in a proportional portion of the presentation of the representation being cleared away/removed/modified at the display screen.

At 708, it is determined whether the duration associated with the sound input operation is equal to or greater than a threshold length of time. In the event that the measured duration of the sound input operation is equal to or greater than the threshold length of time, control is transferred to 710. Otherwise, in the event that the measured duration of the sound input operation is less than the threshold length of time, control is transferred to 712.

At 710, the set of items is completely deleted. Because the measured duration of the sound input operation is at least as long as the threshold length of time, it is assumed that the user had intended to delete the entire set of items.

At 712, a comparison of the duration associated with the sound input operation to the threshold length of time is determined. In the event that the measured duration of time is less than the threshold length of time, a ratio between the measured duration of time and the threshold length of time is determined.

At 714, at least a portion of the set of items is deleted based at least in part on the comparison. Both the portion of the presentation of the representation that is still being shown at the display screen and the portion of the set of items that is determined to be deleted are determined based on the ratio between the measured duration of time and the threshold length of time.

At 716, a size associated with the at least a portion of the set of items that is deleted is presented.

Figure 8:
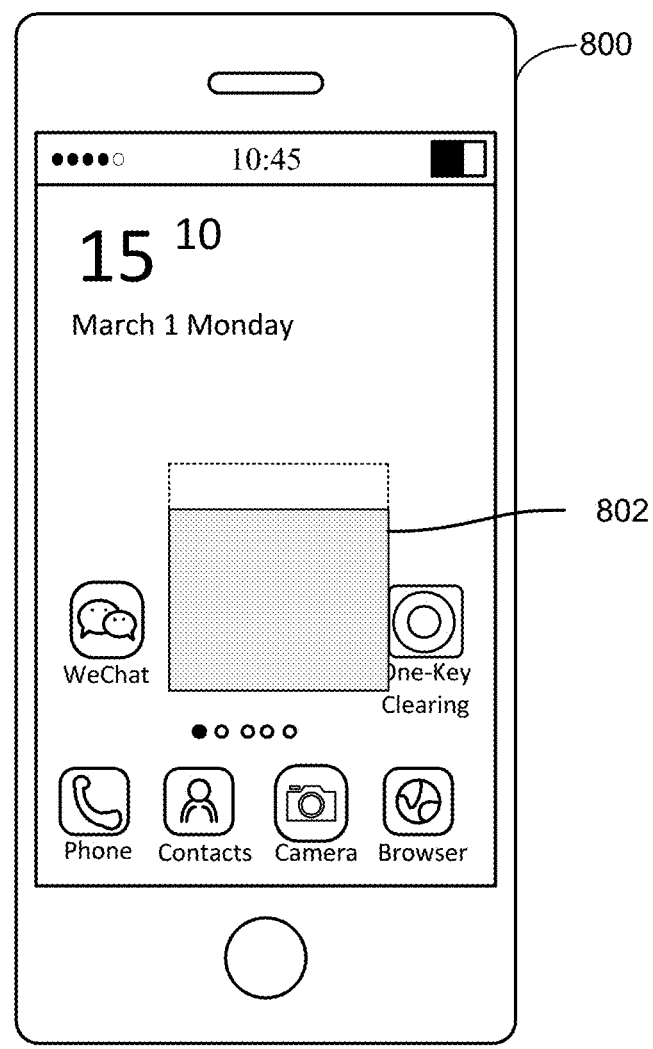
FIG. 8 is an example of a modified presentation of a representation after a user sound operation has been detected.

For example, assume that a measured duration of a user sound operation that lasts for the threshold length of time of 5 milliseconds would cause the entire representation to be cleared away/hidden from view at the display screen of the device. Thus, if the measured duration of time is 1 millisecond, one-fifth of the entire area of the representation can be cleared away/hidden. If the measured duration of time is 2 milliseconds, then two-fifths of the entire area of the representation can vanish; and so on in this fashion, and so forth. FIG. 8 is an example of a modified presentation of a representation after a user sound operation has been detected. In the example of FIG. 8, the portion of the presentation of the top portion of representation 802 has been cleared away in response to a detected user sound input operation. For example, the threshold length of time of a user sound input operation needs to be at least 5 milliseconds long for representation 802 to be completely cleared away/hidden from view at the display screen of device 800. Then, for example, using a process such as process 700 of FIG. 7, if a user input operation of only 1 millisecond were detected, then only one-fifth of representation 802 would be cleared away/hidden from view, as shown in the example of FIG. 8.

As such, some embodiments described herein tightly link a user's sound input operations with the device to the process of deleting items from the device so that the user can better perceive the removal of such files.

Figure 9:
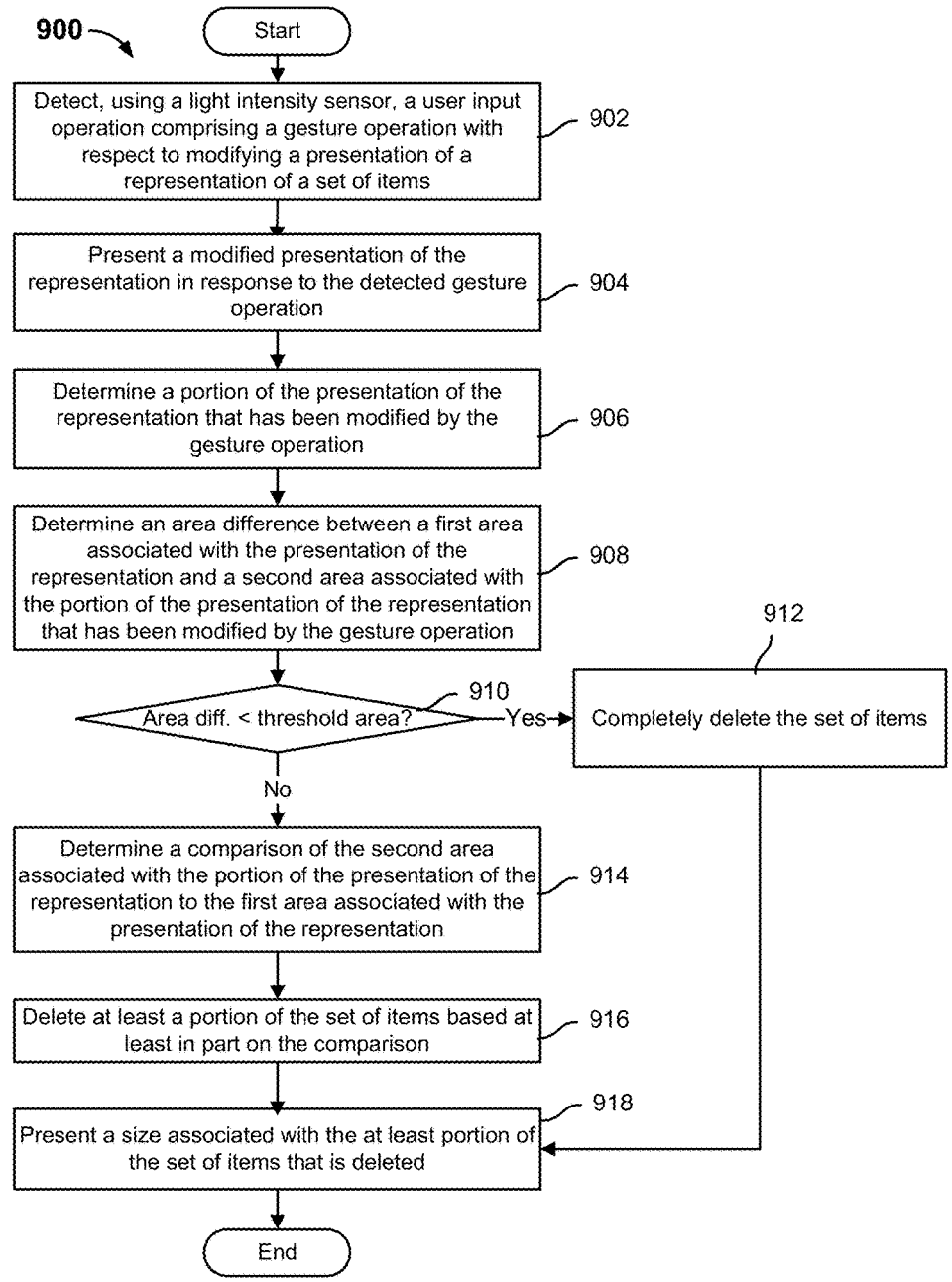
FIG. 9 is a flow diagram showing an example of a process for detecting a user input operation and determining at least a portion of a set of items to delete.

FIG. 9 is a flow diagram showing an example of a process for detecting a user input operation and determining at least a portion of a set of items to delete. In some embodiments, process 900 is implemented at a device such as device 100 of FIG. 1. In some embodiments, steps 208 and 210 of process 200 of FIG. 2 may be implemented, at least in part, using process 900.

Process 900 describes an example of deleting a set of items based on user input operations comprising a user's gesture operation (e.g., a wave of the user's hand that does not contact the display screen) on a representation of a set of items that is presented at a display screen of a device.

At 902, a user input operation comprising a gesture operation is detected using a light intensity sensor. One or more user input operations comprising user's gesture operations (e.g., within a predetermined distance from the display screen) are detected. Each gesture operation (e.g., within a predetermined distance from the display screen) clears away/removes a portion of the representation from being displayed. For example, the user's gesture operation, which can be the user's hand wave, is detected by the light intensity sensor of the device based on the change in light intensity patterns. The more user hand wave motions that are detected by the user, the more of the representation that is cleared away/removed from being displayed. In some embodiments, each detected hand wave motion corresponds to a predetermination amount (e.g., 20%) of the representation being cleared away/removed from being displayed.

At 904, a modified presentation of the representation is presented in response to the detected gesture operation. In some embodiments, the area of the portion of the representation that has been cleared away/removed/modified by the user's gesture operations is presented as being hidden from view at the display screen of the device. For example, the clearing away/removing/modifying of each portion of the representation by the gesture operation may be presented as an animation. By presenting the modification to the presentation of the representation in response to the user's input operation, the user may experience an immediate feedback to their input operations.

At 906, a portion of a presentation of a representation of a set of items that has been modified by the gesture operation is determined. In some embodiments, the area of the portion of the representation that has been cleared away/removed/modified by the user's gesture operations is determined. In some embodiments, the area of the portion of the representation that has been cleared away/removed/modified by the user's gesture operations may be determined after it is determined that the user has finished performing user input operations. For example, one technique by which to determine that the user has finished performing user input operations is the lack of detected user's gesture operations for at least a predetermined length of time.

At 908, an area difference between a first area associated with the presentation of the representation and a second area associated with the portion of the presentation of the representation that has been modified by the gesture operation is determined. The area of the remaining portion of the representation that is presented is determined as a difference between the overall area of the presentation of the representation and the portion of the presentation of the representation that has been modified by the gesture operation. Put another way, the remaining area of the representation that was not cleared away/removed/modified by one or more user's gesture operations is determined.

At 910, it is determined whether the area difference is less than a threshold value. In the event that the first area is less than the threshold area, control is transferred to 912. Otherwise, in the event that the first area is not less than the threshold area, control is transferred to 914.

At 912, the set of items is completely deleted. Because the remainder of the representation is less than a predetermined threshold area, it is assumed that the user had intended to delete the entire set of items even if he or she did not clear away/remove/modify the entire presentation of the representation on the display screen. For example, the predetermined threshold area may be determined to be a relatively small percentage (e.g., 10%) of the total, original area of the representation. Therefore, it is possible to ensure that a set of items is to be entirely deleted from the device, which simplifies/reduces the interactions that need to be performed by the user.

At 914, a comparison of the second area associated with the portion of the presentation of the representation to the first area associated with the presentation of the representation is determined. In some embodiments, the area of the portion of the representation that has been cleared away/removed/modified by the user's gesture operations is compared to the original, total area of the representation (prior to being modified by user input operations) to determine a ratio or a percentage of the representation that has been cleared away/removed/modified.

At 916, at least a portion of the set of items is deleted based at least in part on the comparison. In some embodiments, the ratio or percentage of the total size of the set of items that is deleted as a result of the detected user's gesture operations is the same as the ratio or a percentage of the representation that has been cleared away/removed/modified by the user's gesture operations.

At 918, a size associated with the at least a portion of the set of items that is deleted is presented. If the entire set of items was deleted at step 916, then the total size of the set of items is presented as the amount of items that was deleted.

For example, if the total size of the set of items to be deleted is 600 MB and the entire set of items was determined to be deleted at step 916, then a message that indicates that 600 MB worth of files were deleted is presented. If less than the entire set of items was deleted at step 916, then the portion of the total size of the set of items that was deleted based on the determined ratio is presented.

As such, some embodiments described herein tightly link a user's gesture operations with the device to the process of deleting items from the device so that the user can better perceive the removal of such files.

Figure 10:
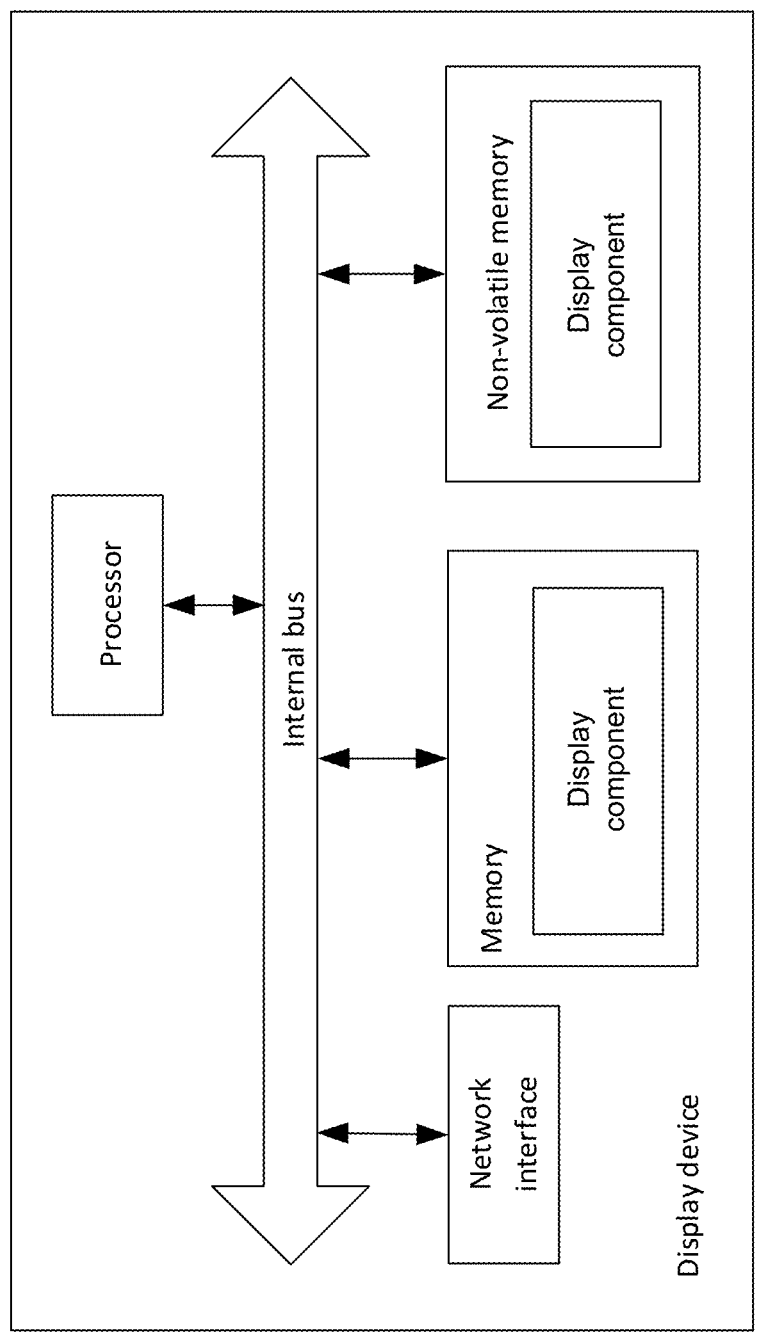
FIG. 10 is a structural diagram of an embodiment of a display device at which items are deleted based on user interaction.

FIG. 10 is a structural diagram of an embodiment of a display device at which items are deleted based on user interaction. As shown in FIG. 10, at the hardware level, the device may comprise a processor, an internal bus, a network interface, memory, and non-volatile memory. The device may also comprise other hardware required for business services, which are not shown.

The processor takes the corresponding computer program from the non-volatile memory to the internal memory and then runs it. The display component described above is implemented in the logical layer which includes the operating system, in some embodiments. The present application does not exclude other implementations in addition to a software implementation, e.g., a logic device (e.g., a programmable electronic component) or a combined software/hardware form. In other words, the entity that executes the process flow need not be limited to the various logical units. It may also be implemented by hardware or a logic device.

Figure 11:
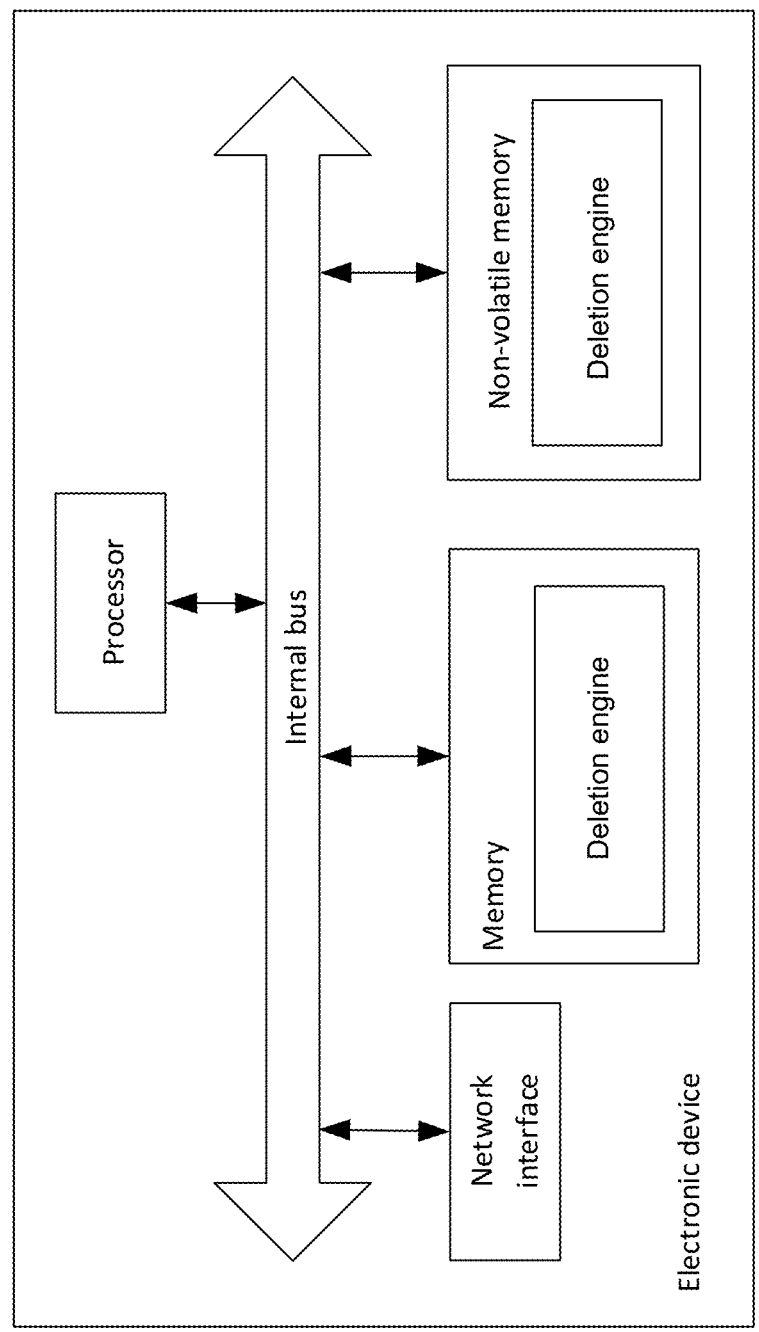
FIG. 11 is a structural diagram of an embodiment of an electronic device at which items are deleted based on user interaction.

FIG. 11 is a structural diagram of an embodiment of an electronic device at which items are deleted based on user interaction. At the hardware level, the electronic device may comprise a processor, an internal bus, a network interface, memory, and non-volatile memory. The electronic device may also comprise other hardware required for business services, which are not shown.

The processor takes the corresponding computer program from the non-volatile memory to the internal memory and then runs it. The deletion engine described above is implemented in the logical layer. The present application does not exclude other implementations in addition to a software implementation, e.g., a logic device or a combined software/hardware form. In other words, the entity that executes the process flow need not be limited to the various logical units. It may also be implemented by hardware or a logic device.

Upon considering the invention disclosed here in the description and in practice, persons skilled in the art shall easily think of other schemes for implementing the present application. The present application intends to cover any variation, use, or adaptation of the present application where these variations, uses, or adaptations comply with the general principles of the present application and include public knowledge or customary technical means in the art which have not been disclosed by the present application. The description and embodiments are regarded merely as illustrative. The true scope and spirit of the present application are indicated by the claims below.

Please also note that the term "comprise" or "contain" or any of their variants are to be taken in their non-exclusive sense. Thus, processes, methods, merchandise, or equipment that comprises a series of elements not only comprises those elements, but also comprises other elements that have not been explicitly listed or elements that are intrinsic to such processes, methods, merchandise, or equipment. In the absence of further limitations, elements that are limited by the phrase "comprises a(n) . . . " do not exclude the existence of additional identical elements in processes, methods, merchandise, or devices that comprise said elements.

The above-described are merely preferred embodiments of the present application and do not serve to limit the present application. Any modifications, equivalent substitutions, or improvements that are performed shall be contained within the protective scope of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining a set of items to delete from a device;
   generating a representation associated with the set of items;
   presenting the representation associated with the set of items at the device;
   detecting a user input operation associated with modifying the presentation of the representation associated with the set of items at the device, wherein the user input operation comprises a touch operation; and
   deleting at least a portion of the set of items based at least in part on the modified presentation of the representation associated with the set of items including by:
   presenting the modified presentation of the representation associated with the set of items;
   determining a portion of the presentation of the representation that has been modified by the touch operation;
   determining a first area associated with the presentation of the representation minus a second area associated with the portion of the presentation of the representation that has been modified by the touch operation;
   determining that the first area associated with the presentation of the representation is less than a threshold area; and
   in response to the determination that the first area associated with the presentation of the representation is less than the threshold area, completely deleting the set of items.

2. The method of claim 1, wherein the set of items comprises one or more of the following: a cache file, an installation package file, and a residual file.

3. The method of claim 1, wherein determining the set of items to delete from the device is based at least in part on a user selection of one or more items.

4. The method of claim 1, wherein determining the set of items to delete from the device comprises programmatically determining that a size associated with the set of items exceeds a predetermined threshold percentage of a total storage space associated with the device.

5. The method of claim 1, wherein generating the representation associated with the set of items comprises generating a visual representation based on at least one or both of content and metadata associated with the set of items.

6. The method of claim 1, further comprising presenting size information associated with the at least portion of the set of items that is deleted.

7. A computer program product, the computer program product comprising a non-transitory computer readable storage medium and comprising computer instructions for:
   determining a set of items to delete from a device;
   generating a representation associated with the set of items;

presenting the representation associated with the set of items at the device;

detecting a user input operation associated with modifying the presentation of the representation associated with the set of items at the device, wherein the user input operation comprises a touch operation; and deleting at least a portion of the set of items based at least in part on the modified presentation of the representation associated with the set of items including by:

presenting the modified presentation of the representation associated with the set of items;

determining a portion of the presentation of the representation that has been modified by the touch operation;

determining a first area associated with the presentation of the representation minus a second area associated with the portion of the presentation of the representation that has been modified by the touch operation;

determining that the first area associated with the presentation of the representation is less than a threshold area; and in response to the determination that the first area associated with the presentation of the representation is less than the threshold area, completely deleting the set of items.

8. The computer program product of claim 7, wherein the set of items comprises one or more of the following: a cache file, an installation package file, and a residual file.

9. The computer program product of claim 7, wherein determining the set of items to delete from the device is based at least in part on a user selection of one or more items.

10. The computer program product of claim 7, wherein determining the set of items to delete from the device comprises programmatically determining that a size associated with the set of items exceeds a predetermined threshold percentage of a total storage space associated with the device.

11. The computer program product of claim 7, wherein generating the representation associated with the set of items comprises generating a visual representation based on at least one or both of content and metadata associated with the set of items.

12. A system, comprising:
a processor configured to:
determine a set of items to delete from a device;
generate a representation associated with the set of items;
present the representation associated with the set of items at the device;
detect a user input operation associated with modifying the presentation of the representation associated with the set of items at the device, wherein the user input operation comprises a touch operation; and
delete at least a portion of the set of items based at least in part on the modified presentation of the representation associated with the set of items including to:
present the modified presentation of the representation associated with the set of items;
determine a portion of the presentation of the representation that has been modified by the touch operation;
determine a first area associated with the presentation of the representation minus a second area associated with the portion of the presentation of the representation that has been modified by the touch operation;
determine that the first area associated with the presentation of the representation is less than a threshold area; and
in response to the determination that the first area associated with the presentation of the representation is less than the threshold area, completely delete the set of items; and
a memory coupled to the processor and configured to provide the processor with instructions.

13. The system of claim 12, wherein the set of items comprises one or more of the following: a cache file, an installation package file, and a residual file.

14. The system of claim 12, wherein determining the set of items to delete from the device is based at least in part on a user selection of one or more items.

15. A method, comprising:
determining a set of items to delete from a device;
generating a representation associated with the set of items;
presenting the representation associated with the set of items at the device;
detecting a user input operation associated with modifying the presentation of the representation associated with the set of items at the device, wherein the user input operation comprises a sound input operation; and
deleting at least a portion of the set of items based at least in part on the modified presentation of the representation associated with the set of items including by:
determining a duration associated with the sound input operation;
presenting the modified presentation of the representation associated with the set of items;
determining that the duration associated with the sound input operation is greater than a threshold length of time; and
in response to the determination that the duration associated with the sound input operation is greater than the threshold length of time, completely deleting the set of items.

16. A method, comprising:
determining a set of items to delete from a device;
generating a representation associated with the set of items;
presenting the representation associated with the set of items at the device;
detecting a user input operation associated with modifying the presentation of the representation associated with the set of items at the device, wherein the user input operation comprises a gesture operation; and
deleting at least a portion of the set of items based at least in part on the modified presentation of the representation associated with the set of items including by:
presenting the modified presentation of the representation associated with the set of items;
determining a portion of the presentation of the representation that has been modified by the gesture operation;
determining a first area associated with the presentation of the representation minus a second area associated with the portion of the presentation of the representation that has been modified by the gesture operation;
determining that the first area associated with the presentation of the representation is less than a threshold area; and in response to the determination that the first area associated with the presentation of the representation is less than the threshold area, completely deleting the set of items.

17. A method, comprising:

determining a set of items to delete from a device;

generating a representation associated with the set of items;

presenting the representation associated with the set of items at the device;

detecting a user input operation associated with modifying the presentation of the representation associated with the set of items at the device, wherein the user input operation comprises a cursor operation; and deleting at least a portion of the set of items based at least in part on the modified presentation of the representation associated with the set of items including by:

presenting the modified presentation of the representation associated with the set of items;

determining a portion of the presentation of the representation that has been modified by the cursor operation;

determining a first area associated with the presentation of the representation minus a second area associated with the portion of the presentation of the representation that has been modified by the cursor operation;

determining that the first area associated with the presentation of the representation is less than a threshold area; and in response to the determination that the first area associated with the presentation of the representation is less than the threshold area, completely deleting the set of items.

* * * * *

UNITED STATES PATENT AND TRADEMARK OFFICE
CERTIFICATE OF CORRECTION

PATENT NO. : 10,503,694 B2
APPLICATION NO. : 15/626958
DATED : December 10, 2019
INVENTOR(S) : Aiqing Chen Page 1 of 1

It is certified that error appears in the above-identified patent and that said Letters Patent is hereby corrected as shown below:

On the Title Page

Item (54), and in the Specification, Column 1, Line(s) 1 & 2, delete "DELETING ITEMS BASED ON USER INTERATION" and insert --DELETING ITEMS BASED ON USER INTERACTION--, therefor.

Signed and Sealed this
Thirtieth Day of June, 2020

Andrei Iancu
*Director of the United States Patent and Trademark Office*